United States Patent Office 3,824,080
Patented July 16, 1974

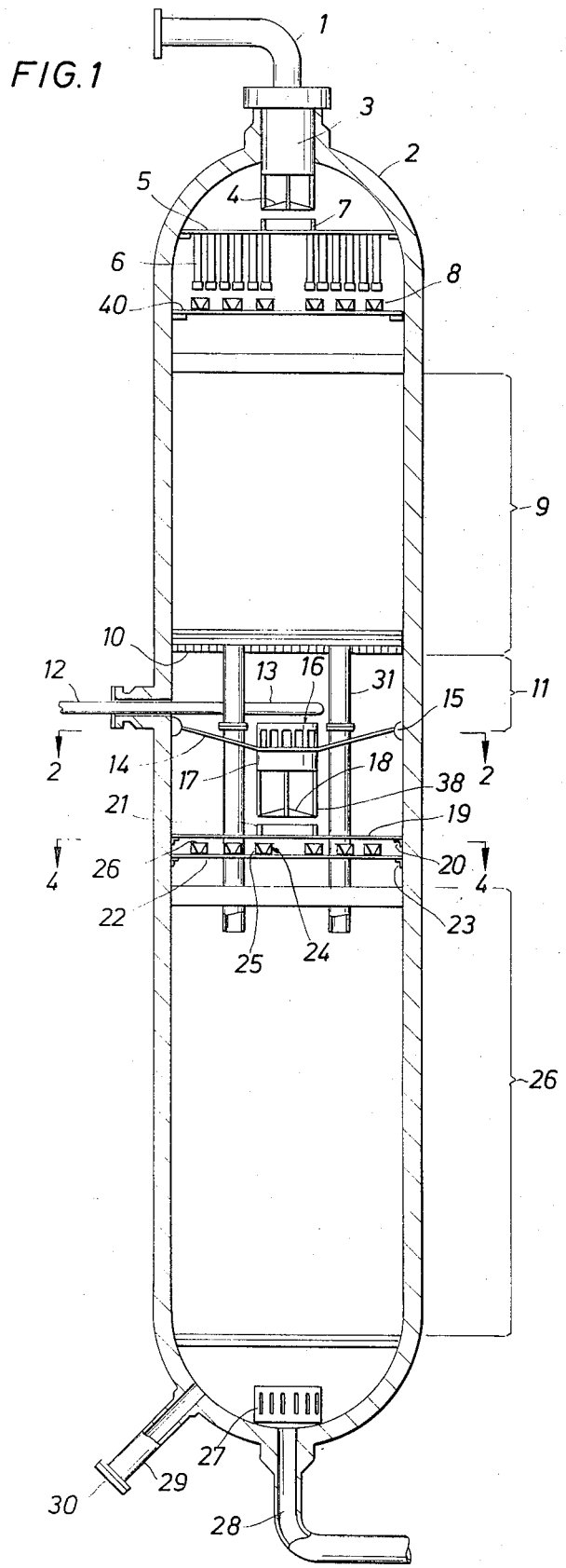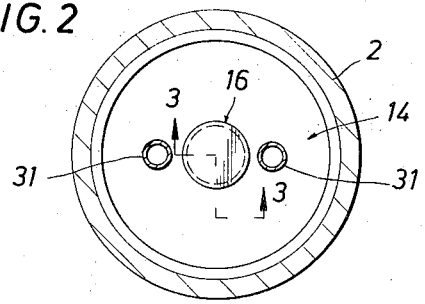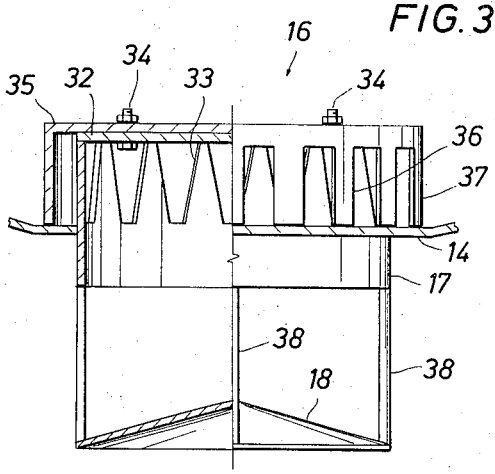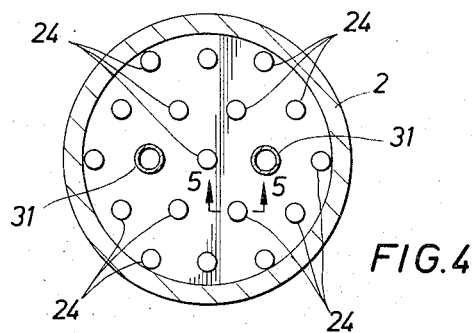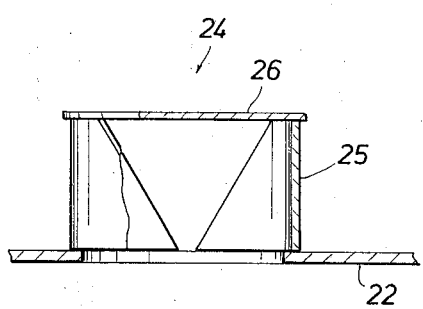

3,824,080
VERTICAL REACTOR
Randlow Smith, John C. Strickland, and John W. Sanwald, Houston, Tex., assignors to Texaco Inc., New York, N.Y.
Filed Apr. 27, 1972, Ser. No. 248,281
Int. Cl. B01j 9/04
U.S. Cl. 23—288 R  9 Claims

ABSTRACT OF THE DISCLOSURE

A vertical, downflow reactor for contacting a two-phase vapor-liquid reaction mixture with solid catalyst contained in two or more reactor vessel catalyst zones, wherein such reactor has means for injecting quench fluid between succeeding catalyst zones. Such reactor comprises reactor internal parts located intermediate to two catalyst zones for intimately mixing vapor and liquid reaction effluents from a first catalyst zone and quench fluid to form a new two-phase vapor-liquid reaction mixture and reactor internal parts for evenly redistributing the new reaction mixture across the top horizontal cross-section of a second catalyst zone.

This application is related to U.S. patent application Ser. No. 248,281, filed Apr. 27, 1972.

BACKGROUND OF THE INVENTION

The present invention relates to a vertical reactor for contacting a two-phase vapor-liquid reaction mixture with solid catalyst contained in two or more reactor vessel catalyst zones, wherein the reaction mixture flows downward. More particularly, the present invention relates to novel reactor internal parts located intermediate to two catalyst zones which are in vertical alignment with one another. Such novel reactor internal parts provide intimate mixing of vapor and liquid reaction effluents from a first catalyst zone, efficient heat transfer between a quench fluid and the vapor-liquid reaction mixture and even redistribution of liquid reactant and vapor reactant across the top horizontal cross-section of a second catalyst zone.

Many vertical, down flow reactors are available for contacting a vapor-liquid mixture with a solid catalyst. In many processes, reactions are exothermic and releases substantial amounts of heat. Commonly such reactors for exothermic reactions are designed with a plurality of catalyst zones, each containing solid catalyst, in vertical alignment one with the other. For such exothermic reactions, it is known to install quench means between catalyst zones such that a quench fluid may be injected into the reactor vessel wherein it mixes with a vapor-liquid reaction effluent from one catalyst zone to absorb excess heat therefrom before such vapor-liquid reaction mixture enters a succeeding catalyst zone.

In such an exothermic catalytic process, quench fluid commonly comprises a vapor component of the reaction mixture. Such quench fluid, at a relatively low temperature, is injected into a reactor vessel wherein the fluid mixes with hot vapor-liquid reaction mixture to reduce the temperature of such reaction mixture. In addition, when the quench fluid comprises a vapor component of the reaction mixture, the quench fluid replaces a portion of the vapor reactant consumed in the preceding catalyst zone. By means of the quench fluid, a selected ratio of vapor to liquid reactants may be maintained in the reactor vessel as well as controlling the reaction temperature.

Quench fluids may be selected from such fluids such as inert gases, liquids which are unreactive under the reaction conditions, and liquid components of the reaction mixture. Most commonly, however, the quench fluid is selected from a vapor component of the reaction mixture, as described above.

Such vertical down flow reactors to which the present invention relates, find application in a variety of continuous processes wherein a vapor-liquid reaction mixture is contacted with a solid catalyst. Particularly, such reactors are useful in processes wherein petroleum oils are reacted in the presence of hydrogn, such as hydrotreating processes for conversion of sulfur and nitrogen components of petroleum oils and hydrocracking processes for conversion of relatively high molecular weight hydrocarbons into lower molecular weight hydrocarbons. Such reactions of petroleum oils with hydrogen are referred to herein as hydrotreating reactions, and such term is intended to include both hydrogen treating for removal of impurities and hydrocracking for reduction of molecular weight. In hydrotreating heavy oils such as reduced crudes, residual oils, and vacuum gas oils, vertical down flow reactors having a plurality of catalyst zones are commonly employed. As such hydrotreating reactions are exothermic, it is common practice to inject a hydrogen quench stream into a quench zone between succeeding catalyst zones. The hydrogen quench stream absorbs heat from the reaction mixture thereby controlling the reaction temperature within a desired range. Additionally the quench stream maintains the ratio of hydrogen to hydrocarbon at a desirably high value. Heavy oils, when treated at elevated temperatures, have a tendency to thermally crack, forming high molecular weight carbonaceous materials and solid coke. Such thermal cracking is in some degree time dependent. Consequently, it is desirable, within a reactor for treating heavy oils, that no area be available where liquid may stand stagnant for extended time periods at elevated temperatures. Areas of hot, stagnant liquid, in addition to undergoing additional thermal cracking with time, also provide areas for carbonaceous deposits to accumulate. Such accumulations of carbonaceous deposits may interfere with flow of reactants through the reactor, and under severe conditions may plug the reactor, preventing all flow therethrough. In addition to thermal cracking, heavy oils tend to crack in the presence of hydrotreating catalyst and under appropriate conditions will form substantial amounts of high molecular weight carbonaceous materials and solid coke. Carbonaceous materials from both thermal cracking and from cracking in the presence of catalysts may accumulate upon the hydrotreating catalyst. Such accumulation of carbonaceous materials reduce catalytic activity of the hydrotreating catalysts. Hydrogen, particularly in the presence of hydrotreating catalyst, reacts with cracked hydrocarbons to form stable compounds and reduce the production of high molecular weight carbonaceous materials. Consequently, a relatively large amount of hydrogen in intimate contact with heavy oil reactants is desirable in a reactor for hydrotreating heavy oils.

SUMMARY OF THE INVENTION

Now according to the present invention, a novel reactor internal configuration is disclosed for a vertical, down flow reactor comprising a reactor vessel having two or more catalyst zones and having quench zones between succeeding catalyst zones. Such a novel reactor internal configuration comprises means for mixing and/or intimately contacting vapor and liquid components of a reaction mixture effluent from a quench zone and evenly distributing vapor and liquid across the horizontal cross-sectional area of a succeeding reactor catalyst zone. Although the novel reactor internal configuration is discussed in the singular in the present disclosure, it is within the contemplation of the present invention that more than one such reactor internal configuration may be employed in a reactor vessel having a plurality of catalyst zones and two or more quench zones.

Said reactor internal configuration is in vertical communication with the bottom of a quench zone and the top of a catalyst zone. In a preferred embodiment, said reactor internal configuration comprises: an inwardly sloping collector tray, the periphery of which contacts the wall of the reactor vessel below a quench zone, and having an opening concentric with the vertical axis of the reactor vessel, for receiving liquid from said quench zone; mixing means upon the upper surface of said collector tray in axial alignment with and covering the opening in said collector tray for mixing and contacting liquid and vapor components from above said collector tray and conveying the mixed vapor and liquid downwardly through the opening in said collector tray; a horizontally disposed dispersing means comprising a splash plate connected to the collector tray below and axially aligned with the collector tray opening for dispersing liquid flowing through said collector tray opening; a liquid distribution means comprising a perforated distributor tray, attached across the horizontal cross-section of the reactor vessel below said collector tray, having a plurality of evenly spaced perforations for the passage of liquid, and a large vapor opening concentric with the vertical axis of the reactor vessel for the passage of vapor; a cylindrical weir, upon the perforated tray, surrounding said vapor opening to prevent liquid flow from the upper surface of said perforated distributor tray through said vapor opening; a second distribution means, attached to said reactor vessel below said liquid distribution means, comprising a distributor tray having a plurality of evenly spaced openings; and a plurality of distributor caps upon the distributor tray covering all the distributor tray opening, for evenly distributing vapor and liquid across the horizontal cross-section of a reactor vessel second catalyst zone.

The reactor internal parts of the present invention provide more efficient mixing of a quench stream with the vapor-liquid reaction mixture effluent from a first catalyst zone, radial mixing of liquid and of vapor across the reactor vessel horizontal cross-section, and even redistribution of vapor and of liquid across the horizontal cross-section of a second catalyst zone. Such reactor internal parts are compact, thus saving reactor volume and have no "dead zones" for the accumulation of stagnant liquid. Pressure drop through the reactor internals of the present disclosure is moderate and there is an absence of small diameter, easily plugged orifices and holes. Considerable flexibility of liquid charge rate may be exercised while maintaining efficient mixing and even redistribution of reactants by employing the reactor internal parts of the present invention.

BRIEF DESCRIPTION OF THE DRAWINGS

FIG. 1 of the attached drawings is a schematic diagram, in section, of a reactor employing the reactor internal configuration of the present invention.

FIG. 2 of the drawings is a sectional view at 2—2 on FIG. 1.

FIG. 3 of the drawings is a sectional view at 3—3 on FIG. 2.

FIG. 4 of the drawings is a sectional view at 4—4 on FIG. 1.

FIG. 5 of the drawings is a sectional view at 5—5 on FIG. 4.

DETAILED DESCRIPTION OF THE INVENTION

Following is a description of the invention with reference to the appended drawings which show one embodiment of the present invention. The invention disclosed herein, the scope of which being defined in the appended claims, is not limited in its application to the details of construction and arrangement of parts shown and described, since the invention is capable of other embodiments. Obvious variations and modifications of the present invention which are within the spirit and scope of the appended claims are considered to be incorporated herein. Also, it is to be understood that the phraseology and terminology employed herein is for the purpose of description and not of limitation.

FIG. 1 of the drawing is a schematic diagram in sectional view of a vertical, down flow reactor, comprising a reactor vessel 2 having two catalyst zones 9 and 26 and a quench zone 11 therebetween for containing a vapor-liquid reaction mixture for reaction in the presence of solid catalyst, which reactor contains the improved reactor internal configuration of the present invention. In FIG. 1 a vapor-liquid mixed phase reaction charge mixture from line 1 enters the top of reactor vessel 2 through inlet nozzle 3. The vapor-liquid mixture strikes splash plate 4 such that the liquid component is distributed across basket support tray 5. The liquid component and a minor portion of the vapor component pass from basket support tray 5 into a plurality of baskets 6, each of which baskets comprises a wire mesh cylindrical body open at the top to the upper surface of support tray 5 and closed at the bottom. Basket support tray 5 comprises a plate defining a plurality of basket openings evenly distributed for receiving the baskets 6 and having a large axially centered opening located below splash plate 4. A major portion of the vapor component of a reaction charge mixture passes through the axially centered opening of the basket support tray 5. A cylindrical weir 7 prevents liquid reaction mixture component on the upper surface of support tray 5 from entering the axial opening. The baskets 6 are provided to collect solid particles which may enter reactor vessel 2 with a charge mixture, thereby preventing such solid particles from entering first catalyst zone 9. Liquid flows through the wire mesh sides of basket 6 and falls upon distributor tray 40. Distributor tray 40 comprises a metal tray having a plurality of evenly distributed perforations. A plurality of cylindrical distributor caps having open bottoms, closed tops, and V-notched sides are located upon the upper surface of distributor tray 40 such that a distributor cap covers each perforation. The liquid and vapor components of the reaction mixture flow through the V-notched weirs and the perforations in distributor tray 40 such that vapor and liquid are evenly distributed across the horizontal cross-sectional area of first catalyst zone 9. First catalyst zone 9 is an upper portion of reactor vessel 2 for holding a bed of solid, particulate catalyst. During operation of a process employing the reactor described herein, a vapor-liquid reaction mixture flows through first catalyst zone 9 intimately contacting solid catalyst, wherein the reaction mixture is at least partially reacted to form desired reaction products. A reaction for which the reactor internal parts of the present invention are designed is an exothermic reaction which liberates heat and increases the temperature of the reaction mixture in first catalyst zone 9.

A reaction mixture comprising vapor and liquid phases passes from first catalyst zone 9 in FIG. 1 through catalyst support means 10 into quench zone 11. Such reaction mixture is at an elevated temperature from the adsorption of heat of reaction evolved in first catalyst zone 9. Also, the reaction mixture is depleted in one or more reactant components and contains a substantial proportion of reaction products. A quench fluid from line 12 enters quench zone 11 through quench nozzle 13 for admixture with the reaction mixture present in quench zone 11. Such quench fluid, at a low temperature mixes with first catalyst zone effluent, which is at an elevated temperature, to form a new mixture which is at an intermediate temperature suitable for admission into a second catalyst zone 26 wherein additional exothermic reactions take place. Quench fluid may be selected from either vapor or liquid materials and may comprise a fluid substantially inert under the reaction conditions within reactor vessel 2 or may comprise one or more of the reactant components of the reaction mixture. Preferably, quench fluid is selected from a vapor component of the reaction charge mixture. For example, in hydrotreating reactions, hydrogen gas is a preferred quench fluid because, in addition to reducing the temperature of reaction mixture effluent from the first catalyst zone 9, such hydrogen gas replaces hydrogen reactant consumed in the hydrotreating reaction.

For quench fluid to effectively reduce the temperature of the hot reaction mixture, it is necessary that such quench fluid intimately contact both the vapor phase and liquid phase components of the reaction mixture. It is the purpose of the present invention to provide an effective means for contacting quench fluid with reaction mixture and subsequently evenly redistribute both the vapor phase and the liquid phase of the reaction mixture across the horizontal cross-sectional area of second catalyst zone 26, FIG. 1, in reactor vessel 2.

Collector tray 14, FIG. 1, receives liquid phase components of the reaction mixture leaving quench zone 11. Such collector tray 14 comprises an inwardly sloping tray, the outer periphery of which is attached to the inner wall of reactor vessel 2 by attachment means 15. Collector tray 14 slopes inwardly and downwardly from its periphery towards the center of reactor vessel 2, and has a circular opening concentric with the vertical axis of reactor vessel 2. The inward slope of collector tray 14 is sufficient for ready liquid flow down the upper surface of tray 14 toward the centrally located opening. Slopes having a drop to run ratio of from about 1:4 to about 1:16 are effective to allow ready flow of liquid down the surface of collector tray 14.

Liquid flowing down collector tray 14, FIG. 1, and vapor from quench zone 11 enters mixing means 16 wherein vapor phase and liquid phase are brought into intimate contact to ensure good heat transfer between the phases. Mixing means 16 is located upon the upper surface of collector tray 14 and is concentric with the vertical center line of reactor vessel 2, covering the opening in collector zone 14.

Vapor and liquid phases from mixing means 16, FIG. 1, pass through the opening in collector tray 14 into mixer downcomer 17. Liquid phase from mixer downcomer 17 passes downward, striking distributor plate 18 in such a manner that the liquid phase is distributed across the horizontal cross-section of reactor vessel 2. Distributor plate 18 is located at a distance spaced below and concentric with mixer downcomer 17 and has a shape effective for dispersing liquid phase impinging thereon. Preferably, distributor plate 18 comprises a cone with upward facing apex, said cone having substantially the same radius as mixer downcomer 17. Distributor plate 18 is maintained in its spaced, concentric relationship to mixer downcomer 17 by a plurality of connecting members 38. Liquid phase and vapor phase materials exit mixer downcomer 17 through the space between mixer downcomer 17 and distributor plate 18.

At a distance spaced below distributor plate 18, FIG. 1, perforated tray 19 spans a horizontal cross-sectional area of reactor vessel 2. The outer periphery of perforated tray 19 is attached to the inner wall of reactor vessel 2 by attachment means 20, forming a vapor tight connection. Perforated tray 19 comprises a circular tray having a major opening concentric with the vertical axis of reactor vessel 2 of about the same radius as distributor plate 18 and having a plurality of evenly spaced minor perforations. The concentric opening in perforated tray 19 is of a size sufficient to allow passage of vapor phase therethrough at a pressure drop not exceeding about 5 inches of water. A cylindrically shaped weir 21 is mounted on tray 19 to surround the concentric hole therein in such a manner as to prevent liquid from flowing into the concentric opening. Preferably, the concentric weir 21 has a height of about 3-5 inches. The top of concentric weir 21 is vertically spaced below the bottom of distributor plate 18 by an amount sufficient to allow passage of vapor therebetween with substantially no pressure drop. The evenly spaced perforations in perforated tray 19 are relatively small, and each of such perforations is of substantially the same diameter. Conveniently such perforations may be in the range of about 2 inches diameter to about 6 inches diameter. The total free area through perforated tray 19, defined by the total area of such minor perforations is sufficient to allow passage of liquid phase accumulated on the upper surface of perforated tray 19 at a pressure drop not exceeding about 2 inches of water and not less than about 0.1 inches of water. Liquid phase from mixer downcover 17 after impinging upon distributor plate 18 is distributed upon the upper surface of perforated tray 19. Such liquid phase distributes evenly upon the upper surface of tray 19 and flows through the evenly distributed perforations in such a manner that liquid flow through perforated tray 19 is substantially evenly distributed across the horizontal cross-sectional area of reactor vessel 2. Vapor phase from mixer downcomer 17 passes through the concentric opening in perforated tray 19. Cylindrical weir 21 prevents liquid upon the surface of perforated tray 19 from flowing through the concentric opening therein. Liquid phase from perforated tray 19 collects upon distributor tray 22 which is vertically spaced below perforated tray 19. Distributor tray 22, as shown in greater detail in FIGS. 4 and 5, comprises a horizontal plate peripherally attached to the inner wall of reactor vessel 2 by attachment means 23, forming a vapor tight connection. Distributor tray 22 has a plurality of evenly spaced openings. Upon the surface of distributor tray 22 and covering each opening are a plurality of distributor caps 24. Each distributor cap 24, as shown in greater detail in FIGS. 4 and 5, comprises a vertically disposed hollow cylindrical member open at the bottom into an opening in distributor tray 22 and closed at the top by a plate member 26. Each cylindrical member 25 of distributor cap 24 has at least 1 V-notched opening with an apex near the upper surface of distributor tray 22 and a base at or near the upper end of cylindrical member 25.

Liquid from perforated tray 19, FIG. 1, collects upon the upper surface of distributor tray 22 from which said liquid flows through the V-notched opening in distributor caps 24. Vapor from above perforated tray 19 flows through tray 19 and flows through the V-notched openings in distributor caps 24 along with the liquid. The total free area defined by openings in distributor tray 22 and the area defined by the V-notched openings in distributor cap 24 are sufficient to allow flow of liquid and vapor phase at a pressure drop not exceeding about 10 inches of water.

Vapor phase and liquid phase flowing through openings in distributour tray 22, FIG. 1, are substantially evenly distributed across the horizontal cross-section of a second catalyst zone 26 of reactor vessel 2. The vapor phase and liquid phase components of the reaction mixture pass downward through second catalyst zone 26 wherein reactants may undergo additional reaction in the presence of solid particulate catalyst to form additional amounts of desired reaction product. From second reaction zone 26 a second reaction effluent comprising a vapor phase and a liquid phase enters outlet cap 27. From outlet cap 27 reaction effluent exits reactor vessel 2 via line 28.

In the operation of a commercial process wherein a solid catalyst is employed to catalyze a desired reaction, such catalyst eventually loses its catalytic activity and must be replaced. Two common means are employed for removing spent catalyst which has lost its catalytic activity from a reactor vessel. One means is to employ a vacuum system wherein catalyst is removed from the top of the reactor vessel 2, FIG. 1, through a suction hose. Preferably however, catalyst is removed from reactor vessel 2 by draining from the bottom under the influence of gravity. A nozzle 29 is provided near the bottom of reactor vessel 2 for draining reactor vessel 2. Catalyst contained in second catalyst zone 26 is in open communication with catalyst drain nozzle 29 and may easily be removed from reactor vessel 2 simply by removing blind flange 30 from catalyst drain nozzle 29 and allowing the catalyst to flow under the influence of gravity from reactor vessel 2.

Catalyst support means 10, FIG. 1, quench zone 11, collector tray 14, perforated tray 19, and distributor tray 22, effectively isolate first catalyst zone 9 from second catalyst zone 26 and catalyst discharge nozzle 29. Therefore to allow removal of catalyst from first catalyst zone 9 through catalyst discharge nozzle 29, a plurality of catalyst drain tubes 31 are provided. Catalyst drain tubes 31 extend upward through catalyst support grating 10 into first catalyst zone 9 and downward into the upper portion of second catalyst zone 26 in such manner that, as catalyst from second catalyst zone 26 is removed, catalysts from first catalyst zone 9 may drain into the second catalyst zone 26 and subsequently be removed from reactor vessel 2 via catalyst discharge nozzle 29. Catalyst drain tubes 31 pass through collector tray 14, perforated tray 19, and distributor tray 22 via openings provided therefor.

The above description is of a reactor having a reactor vessel 2, FIG. 1, comprising two catalyst zones 9 and 26 with one intervening quench zone 9 wherein mixing and redistributing means which are the subject of the present invention are employed. It is to be understood that a plurality of catalyst zones and two or more quench zones may be employed in reactor vessel 2 and that two or more novel mixing and redistributing means disclosed herein may be employed between succeeding catalyst zones.

FIG. 2 of the drawings is a section 2—2 of FIG. 1 showing collector tray 14 and the concentric location of mixing means 16.

FIG. 3 of the drawings is a section 3—3 of FIG. 2. In FIG. 3, collector tray 14 extends inwardly from its periphery, having a concentric, circular opening. Mixer downcomer 17 extends through said concentric opening and a portion of downcomer 17 extends above the upper surface of collector tray 14 and a portion of downcomer 17 extends below the lower surface of tray 14. Mixer cap 37 is situated upon the upper surface of tray 14 encompassing the portion of mixer downcomer 17 which extends above the upper surface of tray 14. Mixer cap 37 and the upper portion of mixer downcomer 17, in association comprise mixing means 16. Mixer downcomer 17 comprises a hollow cylindrical structure having a serrated upper edge forming a plurality of tapered prongs 33 upon the upper portion thereof. The tapered prongs 33 define a plurality of tapered slots extending from a point intermediate to the upper end of the cylindrical wall of downcomer 17. The bottom of such tapered slots are substantially even with the upper surface of collector tray 14. A flat circular plate 32 attachment forms the upper end of mixer downcomer 17 and is attached thereto by any convenient attachment means, such as welding. Mixer cap 37 comprises a hollow cylindrical body open at the bottom and closed at the top by a circular plate 35. Said mixer cap 37 rests upon the upper surface of collector tray 14 encompassing the portion of mixer downcomer 17 which extends above the surface of tray 14. The bottom surface of circular plate 35 rests upon the upper surface of circular plate 32. Circular plate 35 and circular plate 32 are maintained in this association by a plurality of connector means 34, such as bolts. The inside diameter of mixer cap 37 is larger than the outside diameter of mixer downcomer 17, forming an annular space therebetween. A plurality of rectangular prongs 36 extending from a point intermediate to the height to the bottom edge of mixer cap 37 form a plurality of rectangular slots extending from a point intermediate to the height to the bottom edge of mixer cap 37. Preferably the tops of the rectangular slots are substantially even with the top edge of the tapered prongs 33 of mixer downcomer 17, although the tops of the rectangular slots may be located somewhat lower. Mixer downcomer 17 and mixer cap 37 are in such spacial alignment that the tapered prongs 33 of mixer downcomer 17 are in radial alignment with the rectangular slots of mixer cap 37, which alignment forces impingement of liquid and vapor flowing through the rectangular slots onto tapered prongs 33, thereby inducing intimate mixing of the liquid and vapor phases.

Deflector plate 18, FIG. 3, comprises a conical shaped metal plate having an upwardly directed apex and having a diameter substantially the same as the diameter of mixer downcomer 17. Deflector plate 18 is maintained in concentric alignment with mixer downcomer 17 by a plurality of connecting members 38 such that an open space is maintained between the lower edge of mixer downcomer 17 and the periphery of deflector plate 18.

FIG. 4 of the drawings is a section 4—4 of FIG. 1 showing distributor tray 22 and distributor caps 24. Section line 5—5 is through one of the distributor caps 24.

FIG. 5 of the drawings shows section 5—5 of FIG. 4. In FIG. 5 of the drawings, distributor tray 22 comprising a horizontal plate having circular openings, supports distributor cap 24. Distributor cap 24 encompasses the opening in tray 22. Distributor cap 24 comprises a hollow cylinder 25 open at the bottom and closed at the top by flat circular plate 26. Hollow cylinder 25 encompasses and is concentric with the circular hole in tray 22. Cylinder 25 is attached to the upper surface of tray 22, by attachment means such as welding, to maintain the concentric relationship between cylinder 25 and the opening in tray 22. Flat circular plate 26 is attached to the upper edge of cylinder 25, by attachment means such as welding. Cylinder 25 has at least one "V"-shaped notch; preferably, the notch is in the form of a truncated "V." The small end of said V-shaped notch is located at the bottom edge of cylinder 25 and the notch extends upward to the top edge of cylinder 25.

The spacial relationship of distributor cap 24 in FIG. 5 to distributor tray 22 is such that liquid accumulation upon the surface of tray 22 and vapor from above tray 22 flow through the V-shaped notch in cylindrical member 25 and pass downward through the opening in tray 22.

Distributor cap 24 as shown in FIG. 5 is typical of all the distributor caps 24 which cover the evenly spaced openings in tray 22. Vapor and liquid from the upper surface of tray 22 flow through the V-notches in distributor caps 24 and the openings in tray 22 in an even flow distribution pattern across the horizontal cross-section of second catalyst zone 26, as shown in FIG. 1.

While only one embodiment of the invention has been shown in the attached drawings and described above, it will be evident to those skilled in the art that modifications and variations are possible in the arrangement and construction of the reactor internals described without departing from the spirit and scope of the invention as set out in the appended claims.

We claim:

1. In a vertical, down flow reactor, internal parts for mixing and intimately contacting vapor and liquid in a reactor vessel, comprising:
   (a) an inwardly sloping collector tray peripherally sealed to the wall of said reactor vessel and having a central opening concentric with the vertical axis of said reactor vessel;
   (b) a mixer downcomer, comprising an elongated hollow member having a serrated upper edge forming a plurality of tapered prongs defining a plurality of tapered slots, extending vertically through the central opening in said collector tray wherein the bottom of the tapered prongs are substantially even with the upper surface of said collector tray and wherein the wall of said mixer downcomer is sealed to the periphery of the central opening in said collector tray;
   (c) a cover plate attached to the upper end of said hollow mixer downcomer;
   (d) a hollow, elongated mixer cap mounted on the upper surface of the collector tray, said mixer cap being closed at the top, having a slotted lower edge forming a plurality of rectangular prongs defining a plurality of rectangular slots, the inner wall of said mixer downcomer forming an annular space, and the rectangular slots in said mixer cap being radially aligned with the tapered prongs of said mixer downcomer;

(e) attachment means for attaching the mixer downcomer to the mixer cap;

(f) a horizontal distributor plate connected to and concentric with said mixer downcomer, the lower edge of said mixer downcomer and the upper surface of said distributor plate being vertically separated; and (g) a plurality of members connecting the distributor plate to the lower edge of the mixer downcomer.

2. The reactor of Claim 1 wherein the collector tray has a circular central opening; wherein the diameter of the mixer downcomer is substantially the diameter of the circular central opening in said collector tray; wherein the number of rectangular slots in said mixer cap is equal to the number of tapered prongs of said mixer downcomer; wherein the inner wall of said mixer cap is from about two inches to about six inches from the outer wall of said mixer downcomer; and wherein the lower edge of said mixer cap rests upon the upper surface of said collector tray.

3. The reactor of Claim 2 wherein the inwardly sloping collector tray has a drop to run ratio of from about 1:4 to about 1:16.

4. In a vertical, down flow reactor, reactor internal parts for evenly distributing vapor and liquid across the internal horizontal cross-sectional area of a reactor vessel comprising:

(a) a horizontal perforated tray peripherally sealed to the inner wall of the reactor vessel, said perforated tray having a central vapor opening concentric with the vertical axis of said reactor vessel and having a plurality of perforations evenly spaced upon the surface of said perforated tray for passage of liquid therethrough;

(b) a vertical weir upon the upper surface of said perforated tray surrounding the vapor opening in said perforated tray;

(c) a horizontal distributor tray peripherally sealed to the inner wall of the reactor vessel below said perforated tray having a plurality of evenly spaced openings through the surface of said distributor tray; and (d) a plurality of distributor caps upon the upper surface of said distributor tray covering the openings in said distributor tray, each distributor cap comprising an elongated hollow member having a "V"-notch with a small end at the lower edge of said hollow member, and a distributor cap plate covering the upper opening in said elongated hollow member.

5. The reactor of Claim 4 wherein the distributor cap elongated hollow member defines two or more "V"-notches; and wherein the perforated tray perforations have a diameter of from about 2 inches to about 6 inches.

6. In a vertical, down flow reactor, internal parts for mixing and intimately contacting a vapor and liquid and subsequently evenly redistributing said mixed vapor and liquid across the internal cross sectional area of a vertical reactor vessel; comprising:

(a) an inwardly sloping collector tray peripherally sealed to the wall of said reactor vessel and having a central opening concentric with the vertical axis of said reactor vessel;

(b) a mixer downcomer comprising an elongated hollow member having a serrated upper edge forming a plurality of tapered prongs extending from a point intermediate to the length of said elongated hollow member which prongs define a plurality of tapered slots, said mixer downcomer extending vertically through the central opening in said collector tray such that the bottom of the tapered prongs are substantially even with the upper surface of said collector tray and such that the wall of said mixer downcomer is sealed to the periphery of the central opening in said collector tray;

(c) a cover plate attached to the upper end of said hollow mixer downcomer;

(d) a hollow elongated mixer cap mounted on the upper surface of the collector tray and a mixer cap cover plate attached to and closing the upper end of said mixer cap, the lower edge of said elongated hollow mixer cap being slotted to form a plurality of rectangular prongs extending from a point intermediate to the height of said mixer cap and defining a plurality of rectangular slots, the inner wall of the slotted mixer cap and the outer wall of the serrated portion of said mixer downcomer forming an annular space, the rectangular slots in said mixer cap being radially aligned with the tapered prongs of said mixer downcomer and the upper edge of the mixer downcomer being attached to the mixer cap plate;

(e) attachment means for attaching the mixer downcomer to the mixer cap;

(f) a horizontal distributor plate connected concentrically with and below said hollow, elongated mixer downcomer, the lower edge of said mixer downcomer and the upper surface of said distributor plate being vertically separated;

(g) a plurality of members connecting the distributor plate to the lower portion of the mixer downcomer;

(h) a horizontal perforated tray peripherally sealed to said reactor vessel and spaced below said distributor plate, having a central vapor opening concentric with said distributor plate and having a plurality of evenly spaced perforation through the surface of said perforated tray for the passage of liquid therethrough;

(i) a vertical weir attached to the upper surface of said perforated tray surrounding the vapor opening;

(j) a horizontal distributor tray, peripherally sealed to said reactor vessel and spaced below said perforated tray, having a plurality of evenly spaced openings of from about 2 inches to about 6 inches diameter through the surface; and (k) a plurality of hollow, cylindrical distributor caps upon the upper surface of said distributor tray covering the plurality of openings therein, each distributor cap having a closed top and open bottom and the cylindrical portion having a "V"-notch therein with the small end pointing downward.

7. A vertical, down flow reactor for reacting a vapor-liquid, mixed phase reaction mixture in the presence of a solid catalyst comprising:

(a) a vertical vessel having inlet means, a first catalyst zone below said inlet means, a quench zone below said first catalyst zone, a second catalyst zone below said quench zone and an outlet means below said second catalyst zone;

(b) first vapor-liquid distribution means attached within said reactor vessel between said inlet means and said first catalyst zone for evenly distributing reaction charge mixture across the upper horizontal cross-sectional area of said first catalyst zone;

(c) quench means penetrating the wall of said reactor vessel for admitting quench fluid into said quench zone;

(d) an inwardly sloping collector tray prepiperally sealed to the wall of said reactor vessel immediately below said quench zone, having an opening concentric with the vertical center line of said reactor vessel, for collecting liquid passing downward from said quench zone;

(e) mixing means upon the upper surface of said collector tray comprising a hollow elongated mixer cap closed at the top having a plurality of rectangular prongs around the lower edge thereof forming a plurality of rectangular slots and a hollow, elongated mixer downcomer having a plurality of tapered prongs around the upper edge thereof forming a plurality of tapered slots wherein the upper portion of the mixer downcomer extends through, and is sealed to the periphery of the concentric opening in said collector tray such that the bottoms of the tapered prongs are substantially even with the upper surface of the collector tray, wherein the mixer cap covers the upper portion of the mixer downcomer, wherein the inner wall of the mixer cap and the outer wall of the mixer downcomer form an annular mixing space and wherein the rectangular slots in the mixer cap are radially aligned with the tapered prongs of the mixer downcomer, said mixing means being for mixing and intimately contacting liquid and vapor from above said collector means and conveying said mixed vapor and liquid through said collector means;

(f) dispersing means comprising an upward facing conical member spaced below said mixing means and connected thereto for dispersing liquid from said mixing means;

(g) liquid distribution means comprising a horizontal perforated tray, having a concentric vapor opening, peripherally sealed to the wall of said reactor vessel below said dispersing means, and a vertical weir surrounding said vapor opening upon the upper surface of said perforated tray, for evenly distributing liquid from said dispersing means across the horizontal cross-section area of said reactor vessel; and (h) second vapor-liquid distribution means comprising a horizontal distributor tray having a plurality of evenly spaced openings and a plurality of distributor caps, peripherally sealed to the wall of said reactor vessel below said liquid distribution means for evenly distributing vapor and liquid across the horizontal cross-section area of said catalyst zone.

8. The reactor of Claim 7 including a mixer downcomer plate covering mixer downcomer, attached to said mixer downcomer and to said mixer cap.

9. The reactor of Claim 7 including the plurality of distributor caps, each comprising a cylindrical member open at the bottom and closed at the top and having at least one "V"-shaped notch with a small end directed downward.

References Cited

UNITED STATES PATENTS

| | | | |
|---|---|---|---|
| 2,361,021 | 10/1944 | Gibb et al. | 261—114 R |
| 3,702,238 | 11/1972 | Armistead et al. | 23—288 R |
| 2,428,922 | 10/1947 | Shoresman | 261—97 X |
| 3,353,924 | 11/1967 | Riopelle | 23—288 R |

JAMES H. TAYMAN, JR., Primary Examiner

U.S. Cl. X.R.

23—284; 261—114 R, 97; 208—146